US007286903B2

(12) United States Patent
Sehnert

(10) Patent No.: US 7,286,903 B2
(45) Date of Patent: Oct. 23, 2007

(54) ROBOTIC LIBRARY COMMUNICATION PROTOCOL

(75) Inventor: William Sehnert, Lafayette, CO (US)

(73) Assignee: Storage Technology Corporation, Louisville, CO (US)

( * ) Notice: Subject to any disclaimer, the term of this patent is extended or adjusted under 35 U.S.C. 154(b) by 749 days.

(21) Appl. No.: 10/821,437

(22) Filed: Apr. 9, 2004

(65) Prior Publication Data

US 2005/0228541 A1 Oct. 13, 2005

(51) Int. Cl.
*G06F 19/00* (2006.01)
(52) U.S. Cl. .................... 700/245; 700/246; 700/248; 700/249; 700/251; 700/253; 318/567; 414/277
(58) Field of Classification Search ............... 414/277; 700/245, 246, 248, 249, 251, 253; 318/567
See application file for complete search history.

(56) References Cited

U.S. PATENT DOCUMENTS

| 4,928,245 | A | * | 5/1990 | Moy et al. ................... 700/218 |
| 5,491,531 | A | * | 2/1996 | Adams et al. ............... 375/354 |
| 5,493,571 | A | * | 2/1996 | Engdahl et al. ............. 370/514 |
| 6,130,800 | A | * | 10/2000 | Ostwald ...................... 360/92 |
| 6,304,798 | B1 | * | 10/2001 | Carpenter ................... 700/258 |
| 6,327,519 | B1 | * | 12/2001 | Ostwald et al. ............. 700/245 |
| 6,381,517 | B1 | * | 4/2002 | Butka et al. ................. 700/247 |
| 6,441,991 | B2 | * | 8/2002 | Ostwald et al. ............... 360/92 |
| 6,480,759 | B1 | * | 11/2002 | Ostwald et al. ............. 700/245 |
| 6,535,790 | B2 | * | 3/2003 | Nakano et al. ............. 700/214 |
| 6,583,903 | B1 | * | 6/2003 | Way et al. ................... 398/152 |
| 6,658,526 | B2 | * | 12/2003 | Nguyen et al. ............. 711/111 |
| 6,675,326 | B1 | * | 1/2004 | Yoshizaki ..................... 714/48 |
| 6,751,048 | B2 | * | 6/2004 | Ostwald et al. ............... 360/92 |
| 6,760,644 | B2 | * | 7/2004 | Canaday et al. ............ 700/245 |
| 6,931,304 | B1 | * | 8/2005 | Miller et al. ................. 700/245 |
| 7,039,924 | B2 | * | 5/2006 | Goodman et al. ........... 720/600 |
| 2003/0004609 | A1 | * | 1/2003 | Canaday et al. ............ 700/245 |
| 2003/0067702 | A1 | * | 4/2003 | Iles et al. ...................... 360/69 |
| 2005/0234592 | A1 | * | 10/2005 | McGee et al. .............. 700/245 |

(Continued)

OTHER PUBLICATIONS

Guillemin P. et al.; "The European Home Systems Protocol—Concepts and Products" Online?; Mar. 7, 2001, XP002337465; Retrieved from the Internet: URL:http://web.archive.org/web/20010307125902/http://www.domotics.com/homesys/HSpapers/EHSproto.htm> 'retrieved on 2005-07-022I pp. 5, 8, 9;figure 7.

(Continued)

*Primary Examiner*—Thomas Black
*Assistant Examiner*—Wae Lenny Louie
(74) *Attorney, Agent, or Firm*—Brooks Kushman P.C.

(57) ABSTRACT

A method and system are disclosed for transmitting data among robots and a controller computer system within an automated robotic library. A robotic library communication protocol is described for communicating among the robotic mechanisms and the controller computer system. The robotic library communication protocol defines multiple fields for each packet including a preamble field that describes a predetermined preamble value that is equal to a particular value. Data is transmitted among the robotic mechanisms and the controller computer system utilizing the robotic library communication protocol. Each packet that conforms to the protocol includes only the preamble value in the preamble field. Power is provided to the robotic mechanisms utilizing a power signal. Data that has been encoded according to the protocol is transmitted to the robotic mechanisms using the power signal.

20 Claims, 4 Drawing Sheets

U.S. PATENT DOCUMENTS

2006/0282194 A1* 12/2006 Schaefer et al. ............ 700/245

OTHER PUBLICATIONS

Wade E et al.; "One-wire smart motors communicating over the DC power bus-line with application to endless rotary joints" Proceedings 2002 IEEE International Conference on Robotics and Automation (Cat. No. 02CH37292) IEEE Piscataway, NJ, USA, vol. 3, May 2002, pp. 2369-2374 vol. XP002337432; ISBN: 0-7803-7272-7, paragraphs 1, 2, 6, figure 9.

* cited by examiner

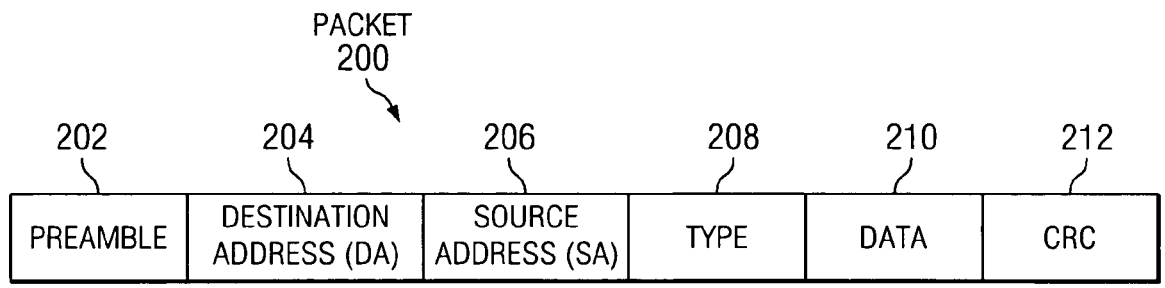
*FIG. 2a*
| FIELD | OFFSET | SIZE (BYTES) | DESCRIPTION |
|---|---|---|---|
| PREAMBLE | 0 | 2 | VALUE ALWAYS=0x4B 0x53 |
| DESTINATION ADDRRESS | 2 | 6 | DESTINATION ADDRESS |
| SOURCE ADDRESS | 8 | 6 | SOURCE ADDRESS |
| TYPE | 14 | 2 | TYPE OF THE PACKET |
| DATA | 16 | 0-1500 | USER DATA |
| CRC | VARIES | 2 | CRC THAT IS CALCULATED USING ALL OTHER FIELDS |
*FIG. 2b*
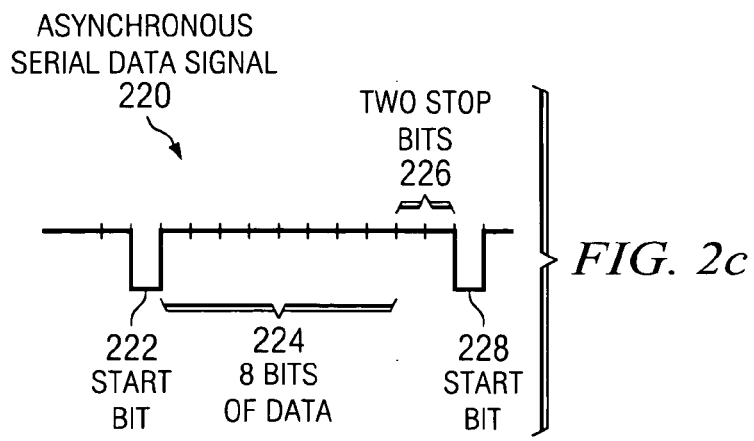
*FIG. 2c*

ROBOTIC LIBRARY COMMUNICATION PROTOCOL

BACKGROUND OF THE INVENTION

1. Technical Field

The present invention relates generally to the field of data processing systems, and specifically to an automated data storage library. The present invention relates still more particularly to a method and system for communicating among robotic mechanisms in an automated data storage library utilizing a robotic library communication protocol.

2. Description of Related Art

Automated data storage libraries incorporate one or more robotic mechanisms for moving data cartridges around within the library. These robots typically move about utilizing one or more rails on which the robots reside. One known library system delivers power to the robots utilizing these rails.

Movement and the actions of these robots are typically controlled by a controller computer included in the library. The controller computer and the robots of the library are typically connected directly to each other in order to transmit data among the computer and the robots.

The controller is a fixed computer attached to the frame of the library and directs the motions of the robots. The robots are mobile machines within the library that receive their commands from the controller.

Therefore, a need exists for a method and system for transmitting communications using a power transmission means among robotic mechanisms in an automated data storage library utilizing a robotic library communication protocol.

SUMMARY OF THE INVENTION

A method and system are disclosed for transmitting data among robots and a controller computer system within an automated robotic library. A robotic library communication protocol is described for communicating among the robotic mechanisms and the controller computer system. The robotic library communication protocol defines multiple fields for each packet including a preamble field that describes a predetermined preamble value that is equal to a particular value. Data is transmitted among the robotic mechanisms and the controller computer system utilizing the robotic library communication protocol. Each packet that conforms to the protocol includes only the preamble value in the preamble field. Power is provided to the robotic mechanisms utilizing a power signal. Data that has been encoded according to the protocol is transmitted to the robotic mechanisms using the power signal.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2a is a block diagram that depicts a packet that conforms to a robotic library communication protocol in accordance with the present invention;

FIG. 2b is a table that illustrates each field in a robotic library communication protocol and the size and location of each field in accordance with the present invention;

FIG. 2c depicts one byte of an asynchronous serial data signal in accordance with the present invention;

DETAILED DESCRIPTION OF THE PREFERRED EMBODIMENT

Figure 1:
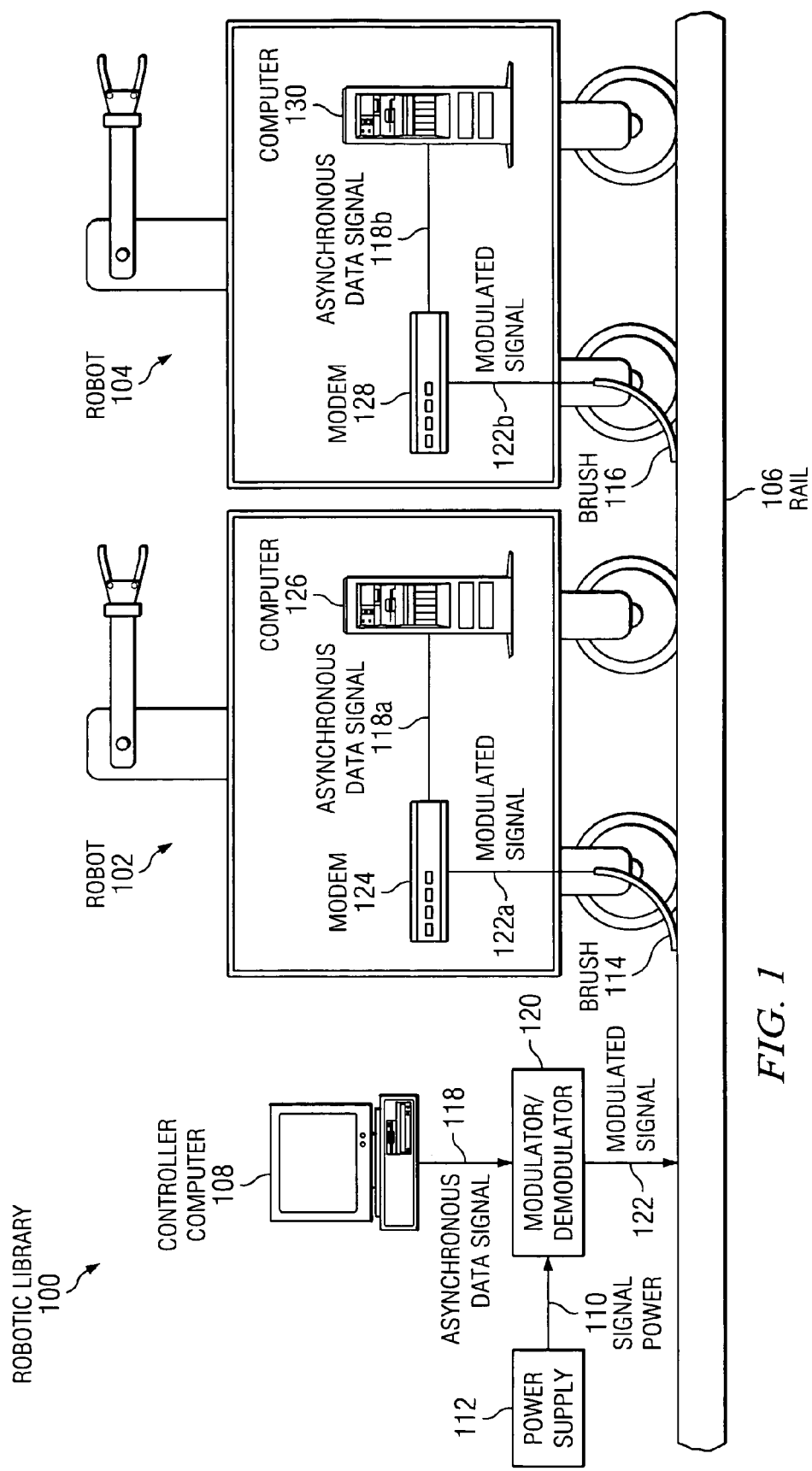
FIG. 1 depicts an automated robotic data storage library in accordance with the present invention.

A preferred embodiment of the present invention and its advantages are better understood by referring to the figures, like numerals being used for like and corresponding parts of the accompanying figures.

The present invention is a method and system for transmitting data among robots and a controller computer system within an automated robotic library. A robotic library communication protocol is described for communicating among the robotic mechanisms and the controller computer system. The robotic library communication protocol defines multiple fields for each packet including a preamble field that describes a predetermined preamble value that is equal to a particular value. Data is transmitted among the robotic mechanisms and the controller computer system utilizing the robotic library communication protocol. Each packet that conforms to the protocol includes only the particular preamble value in the preamble field.

In addition to the preamble field, the robotic communications protocol also defines for each packet a destination address field for storing an address of the intended recipient of the packet, a source address field for storing the address of the sender of the packet, a type field for storing an identification of a type of the packet, a data field for storing user data, and an error checking field for storing an error checking character.

Power is provided to the robotic mechanisms utilizing a power signal that is delivered to each robot utilizing one or more rails on which the robots move about. When data is to be transferred among the robots and controller computer system, the data is encoded using the robotic communication protocol. Once encoded, the data is converted to a stream of bytes that is then converted to an asynchronous data signal. This asynchronous data signal is then modulated on top of the power signal. The modulated signal is transmitted to the robotic mechanisms using the power delivery system. In the preferred embodiment, the power delivery system is a pair of rails on which the robots reside and move about.

Robots then receive the modulated signal. They demodulate the signal to separate the power signal used to power the robots from the data signal. The received data signal is converted into a series of bytes. If the series of bytes includes a preamble that is set to the predetermined value as defined by the robotic communications protocol, the rest of the data signal is decoded according to the protocol. If the series of bytes does not include a preamble that is set to the predetermined value, the data signal is discarded and not processed.

The modulator/demodulators that are described below may be used to transmit or receive data. Although the controller computer system is described as transmitting a message and each robot is described as receiving a message, the controller computer system and each robot are all capable of either transmitting data or receiving data using the methods described herein. That is, a robot may use the method described below with reference to FIG. 3 to transmit a message, and the controller computer may use the method of FIG. 4 to receive that message sent by a robot.

FIG. 1 depicts a robotic library 100 in accordance with the present invention. Robotic library 100 includes a robot 102 and a robot 104 that travel via a power transmission means, such as a rail 106. A computer controller 108 is utilized to control the movement of robots 102, 104 and to transmit and receive data to and from robots 102, 104 utilizing rail 106.

Power is provided by a power signal 110 output by power supply 112 to robots 102, 104 utilizing rail 106. Robot 102 receives power utilizing brushes 114. Robot 104 receives power utilizing brushes 116.

The present invention provides a method and system for transmitting data among robots 102, 104 and computer controller 108 utilizing rail 106. Data is transmitted utilizing rail 106 by modulating a data signal on top of the power that is provided via rail 106. Computer controller 108 provides a message that is encoded utilizing an asynchronous data signal 118. Asynchronous data signal 118 is provided from controller computer 108 to modulator/demodulator 120. Modulator/demodulator (MODEM) 120 also receives power signal 110. MODEM 120 generates a modulated signal 122 by modulating asynchronous data signal 118 on top of power signal 110. MODEM 120 converts every digital zero of the signal 118 into a 5.5 MHz signal, and every digital one into a 6.6 MHz signal. Thus, MODEM 120 provides to rail 106 modulated signal 122 which delivers both power and data to rail 106. Rail 106 transmits modulated signal 122 to robots 102, 104.

Each robot receives the modulated signal via brushes which transmit the modulated signal to a modulator/demodulator included in the robot. For example, robot 102 receives modulated signal 122 via brushes 114 which provides the received modulated signal 122a to a modulator/demodulator 124 that is included in robot 102. Modulator/demodulator 124 demodulates modulated signal 122a to separate asynchronous data signal 118a from the power signal. MODEM 124 converts every 5.5 MHz signal into a digital zero, and every 6.6 MHz signal to a digital one. Asynchronous data signal 118a is provided to a computer 126 that is also included in robot 102. Computer 126 then converts the asynchronous data signal 118a to create a stream of bytes. Computer 126, as described in detail below, determines whether the stream of bytes conforms to the communication protocol. If the stream of bytes conforms to the communication protocol, computer 126 processes the remaining data. If the stream of bytes does not conform to the communication protocol, computer 126 discards and thus ignores the remaining data.

Robot 104 receives modulated signal 122 via brushes 116 which provides the received modulated signal 122b to a modulator/demodulator 128 that is included in robot 104. Modulator/demodulator 128 demodulates received modulated signal 122b to separate asynchronous data signal 118b from the power signal. Asynchronous data signal 118b is provided to a computer 130 that is also included in robot 104. Computer 130 then converts the asynchronous data signal 118b to create a stream of bytes. Computer 130, as described in detail below, determines whether the stream of bytes conforms to the communication protocol. If the stream of bytes conforms to the communication protocol, computer 130 processes the remaining data. If the stream of bytes does not conform to the communication protocol, computer 130 discards and thus ignores the remaining data.

FIG. 2a is a block diagram that depicts a packet that conforms to a robotic library communication protocol in accordance with the present invention. Each packet 200 that conforms to the protocol will include six different fields. The first field is a preamble field 202 in which a predefined preamble value is stored. The second field is a destination address (DA) field 204 in which a destination address is stored. The third field is a source address (SA) field 206 in which a source address is stored. The fourth field is a type field 208 in which a type is stored. The fifth field is a data field 210 in which message data is stored. The sixth field is a CRC field 212 in which an error checking character, such as a CRC, is stored.

FIG. 2b is a table that illustrates each field in a robotic library communication protocol and the size and location of each field in accordance with the present invention. The first field is the preamble field. The destination address field follows the preamble field. The source address field follows the destination field. The type field follows the source field. The data field follows the type field. And, the CRC field follows the data field.

The preamble field is the first field in each packet and therefore includes a zero offset from the start of each packet. The preamble is two bytes long and is a predetermined value. According to the preferred embodiment, the predetermined value is "0x4B 0x53". All packets that conform to the robotic library communication protocol will include this predetermined value stored in the preamble field. Those skilled in the art will recognize that any other value may be used in the preamble field so long as the value is predetermined and all packets that conform to the protocol include this value as the preamble in the preamble field.

The next field in each packet is a destination address field that is six bytes long and offset from the start of the packet by the two bytes of the preamble field. The address of the intended recipient is stored in this field.

The next field in each packet is a source address field that is six bytes long and offset from the start of the packet by eight bytes, the two bytes of the preamble and the six bytes of the destination address. The address of the sender of the packet is stored in this field.

The next field in each packet is a type field that is two bytes long and offset from the start of the packet by 14 bytes, the two bytes of the preamble, the six bytes of the destination address, and the six bytes of the source address. A type is used to identify the type of the packet. For example, a packet may be a maintenance packet or a regular IP communication packet.

The next field in each packet is a data field that is between 0 and 1500 bytes long depending on the length of the data. The user data is stored in the data field. The data field is offset from the start of the packet by 16 bytes, the two bytes of the preamble, the six bytes of the destination address, the six bytes of the source address, and the two bytes of the type field.

The last field in the packet is a CRC field which is two bytes long and stores a CRC of the packet. A CRC is calculated using all of the fields from the preamble through the user data field. According to the preferred embodiment, the CRC is calculated using the following formula where x is equal to the string including the value of the preamble, destination address, source address, type, and user data:
$x^{32}+x^{26}+x^{23}+x^{22}+x^{16}+x^{12}+x^{11}+x^{10}+x^{8}+x^{7}+x^{5}+x^{4}+x^{2}+x^{1}+x^{0}$.

FIG. 2c depicts one byte of an asynchronous serial data signal in accordance with the present invention. Each packet of data is divided into bytes. The bytes that make up the packets are converted into a stream of bytes. The stream of bytes is then converted into an asynchronous serial data signal 220. Each byte is represented by 11 bits of data including a start bit 222, eight bits of data 224, and two stop bits 226. Start bit 222 indicates the start of another byte of signal 200 while stop bits 226 indicate the end of the byte. The actual data of the byte is represented by bits 224. The start of the next byte of data in the signal 220 is indicated by the start bit 228 of the next byte.

Figure 3:
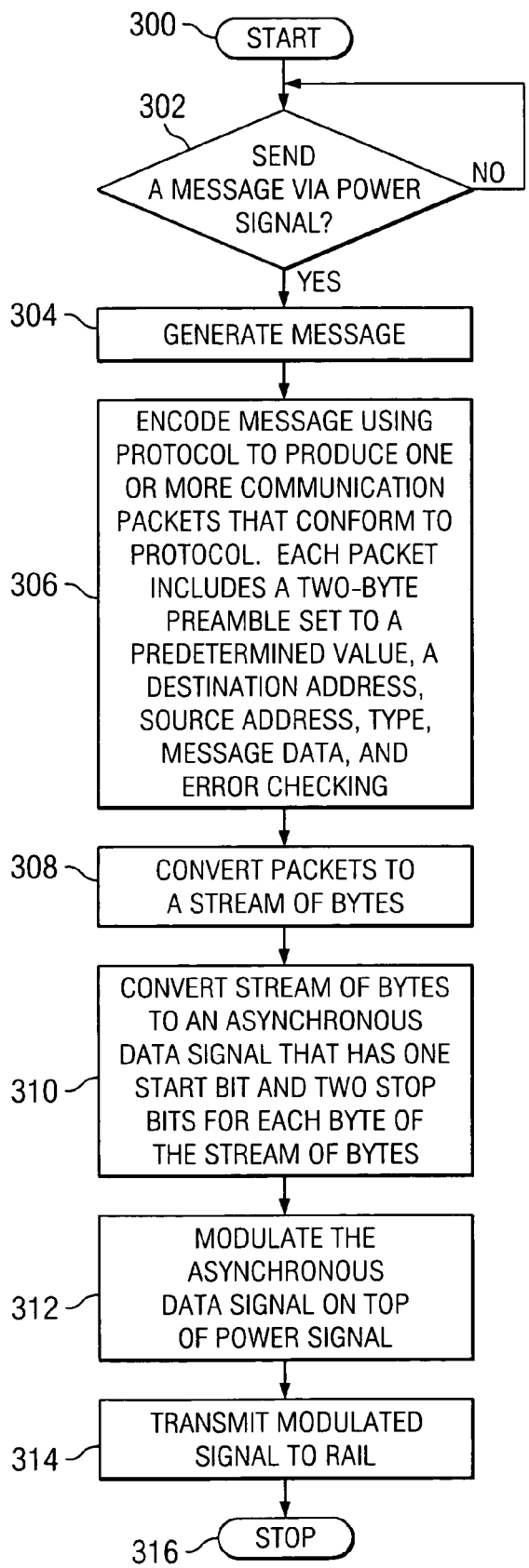
FIG. 3 illustrates a high level flow chart which depicts encoding a message using a robotic library communication protocol to produce an asynchronous serial data signal, modulating the encoded message on top of a power signal, and transmitting the modulated signal in accordance with the present invention.

FIG. 3 illustrates a high level flow chart which depicts encoding a message using a robotic library communication protocol to produce an asynchronous serial data signal, modulating the encoded message on top of a power signal, and transmitting the modulated signal in accordance with the present invention. The process starts as depicted by block 300 and thereafter passes to block 302 which illustrates a determination of whether or not to send a message to a robot using the robotic library communication protocol via the robot power signal. If a determination is made that no message is to be sent, the process passes back to block 302.

Referring again to block 302, if a determination is made that a message is to be sent to a robot using the robotic library communication protocol via the robot power signal, the process passes to block 304 which depicts generating a message to send. Next, block 306 illustrates encoding the message using the robotic library communication protocol to produce one or more communication packets that conform to the protocol. Each packet includes a two-byte preamble set to a predetermined value, a destination address that identifies the intended recipient, a source address that identifies the sender, a type that identifies the type of packet, user data, and an error checking code such as a CRC.

Next, block 308 depicts converting the packets into a stream of bytes. Thereafter, block 310 illustrates converting the stream of bytes into an asynchronous data signal that has one start bit and two stops bits that delimit each byte of the stream of bytes. Block 312, then, depicts modulating the asynchronous data signal on top of the rail power signal. Thereafter, block 314 illustrates transmitting the modulated signal to the rail. The process then terminates as depicted by block 316.

Figure 4:
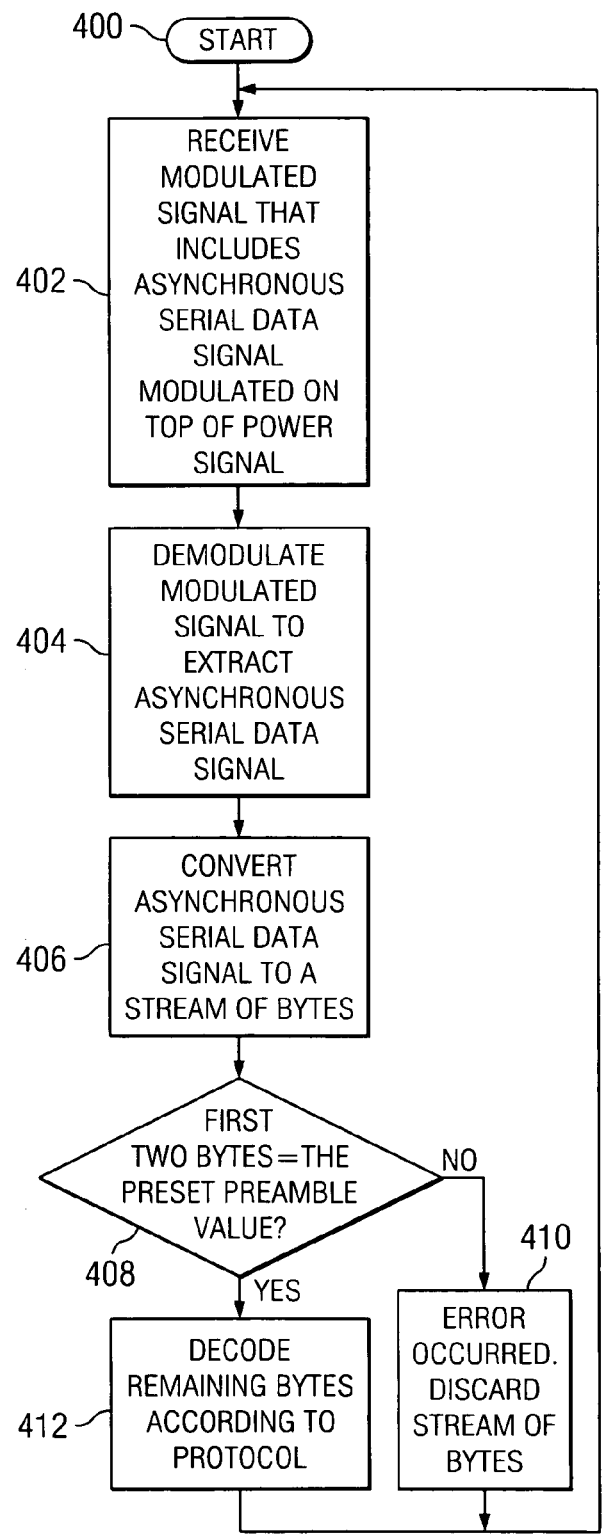
FIG. 4 depicts a high level flow chart which illustrates receiving a modulated signal, extracting an asynchronous serial data signal, and decoding the asynchronous serial data signal using a robotic library communication protocol in accordance with the present invention.

FIG. 4 depicts a high level flow chart which illustrates receiving a modulated signal, extracting an asynchronous serial data signal, and decoding the asynchronous serial data signal using a robotic library communication protocol in accordance with the present invention. The process starts as depicted by block 400 and thereafter passes to block 402 which illustrates receiving the modulated signal that includes the asynchronous data serial signal modulated on top of the rail power signal at a robot. Next, block 404 depicts demodulating the modulated signal to extract the asynchronous serial data signal.

Block 406, then, illustrates converting the asynchronous serial data signal to a stream of bytes. Thereafter, block 408 depicts a determination of whether or not the first two bytes of the stream of bytes equal the predetermined preset preamble value. If a determination is made that the first two bytes of the stream of bytes do not equal the predetermined preset preamble value, the process passes to block 410 which illustrates the occurrence of an error. The stream of bytes is then discarded. The process passes back to block 402.

Referring again to block 408, if a determination is made that the first two bytes of the stream of bytes do equal the predetermined preset preamble value, the process passes to block 412 which illustrates decoding the remaining bytes according to the robotic library communication protocol. The process passes back to block 402.

Figure 5:
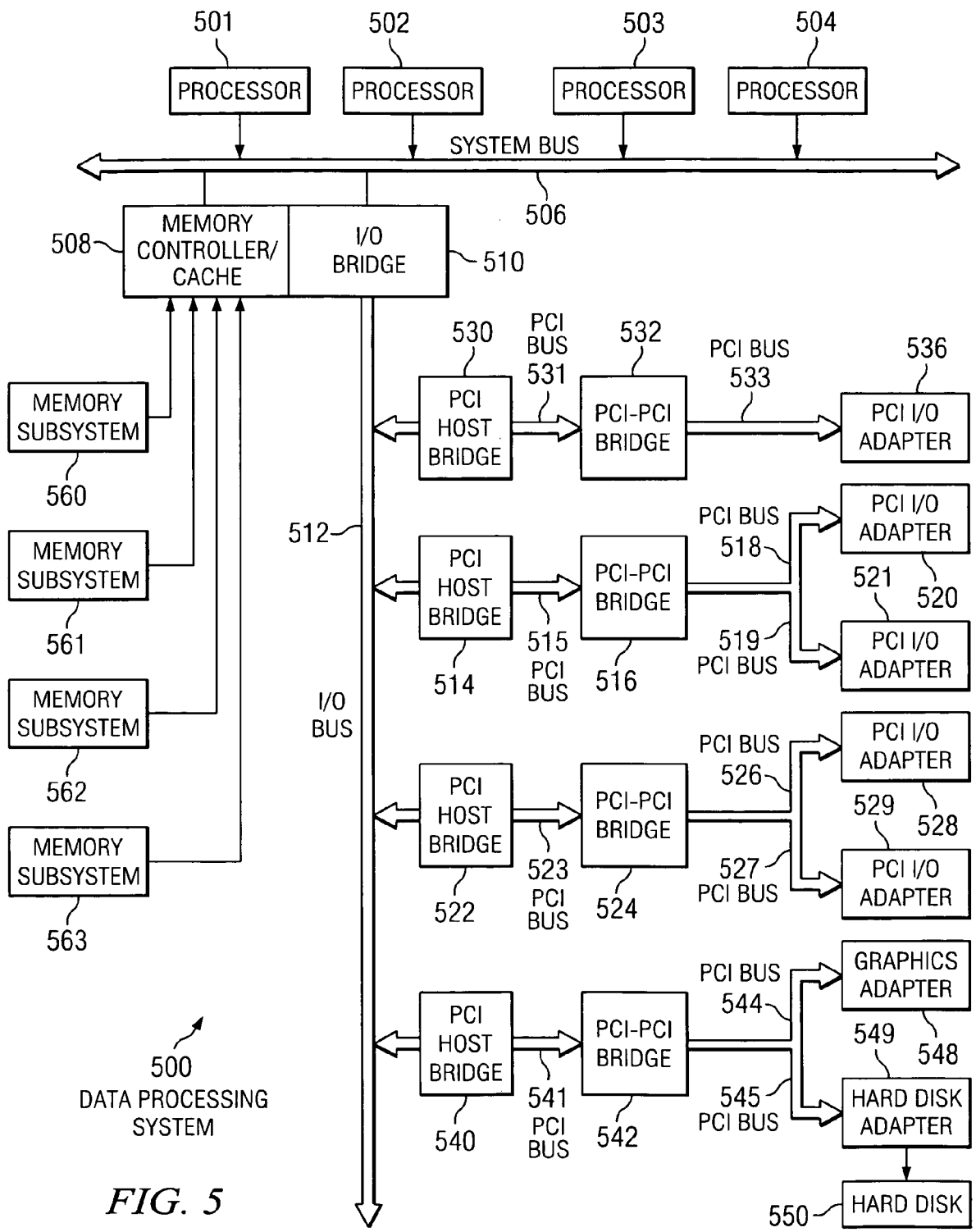
FIG. 5 is a detailed block diagram of a computer system that may be used to implement one of the computer systems or controller computer system of FIG. 1 in accordance with the present invention.

FIG. 5 illustrates a detailed block diagram of a computer system that includes the present invention in accordance with the present invention. Computer system 500 may be a symmetric multiprocessor (SMP) system including a plurality of processors 501, 502, 503, and 504 connected to system bus 506. Alternatively, a single processor system may be employed. Also connected to system bus 506 is memory controller/cache 508, which provides an interface to a plurality of memory subsystems 560-563. I/O bus bridge 510 is connected to system bus 506 and provides an interface to I/O bus 512. Memory controller/cache 508 and I/O bus bridge 510 may be integrated as depicted.

Data processing system 500 may be a logically partitioned data processing system. Thus, data processing system 500 may have multiple heterogeneous operating systems (or multiple instances of a single operating system) running simultaneously. Each of these multiple operating systems may have any number of software programs executing within it. Data processing system 500 may be logically partitioned such that different I/O adapters 520-521, 528-529, 536, and 548-549 may be assigned to different logical partitions.

Peripheral component interconnect (PCI) Host bridge 514 connected to I/O bus 512 provides an interface to PCI local bus 515. A number of Input/Output adapters 520-521 may be connected to PCI bus 515 through PCI to PCI bridge 516. Typical PCI bus implementations will support between four and eight I/O adapters (i.e. expansion slots for add-in connectors). Each I/O Adapter 520-521 provides an interface between data processing system 500 and input/output devices such as, for example, other network computers, which are clients to data processing system 500.

PCI host bridge 530 provides an interface for PCI bus 531 which is connected to PCI-PCI bridge 532. PCI-PCI bridge 532 is coupled to a PCI I/O adapter 536 through PCI bus 533.

An additional PCI host bridge 522 provides an interface for an additional PCI bus 523. PCI bus 523 is connected to a plurality of PCI I/O adapters 528-529 through a PCI-PCI bridge 524 and PCI bus 526-527. Thus, additional I/O devices, such as, for example, modems or network adapters may be supported through each of PCI I/O adapters 528-529. In this manner, data processing system 500 allows connections to multiple network computers.

A memory mapped graphics adapter 548 may be connected to I/O bus 512 through PCI Host Bridge 540 and PCI-PCI bridge 542 via PCI buses 541, 544 and 545 as depicted.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in for transmitting data among robotic mechanisms and a controller computer system in an automated data storage library, said method comprising the steps of:
    providing a robotic library communication protocol for communicating among said robotic mechanisms and said controller computer system, said robotic library communication protocol defining a plurality of fields for each packet including a preamble field that describes a predetermined preamble value that is equal to a particular value;
    transmitting data among said robotic mechanisms and said controller computer system utilizing said robotic library communication protocol; and
    each packet that conforms to said protocol including only said preamble value in said preamble field.

2. The method according to claim 1, further comprising the steps of:
    providing power to said robotic mechanisms utilizing a power signal; and
    transmitting said data using said power signal.

3. The method according to claim 1, further comprising the steps of:
    providing power to said robotic mechanisms utilizing a power signal;
    transmitting said data using said power signal by modulating said data on top of said power signal to generate a modulated signal;
    transmitting said modulated signal to said robotic mechanisms; and
    said robotic mechanisms being powered by a power signal that is extracted from said modulated signal.

4. The method according to claim 3, further comprising the steps of:
    receiving said modulated signal at one of said robotic mechanisms;
    demodulating said modulated signal to produce a received data signal and received power; and
    powering said one of said robotic mechanisms utilizing said received power.

5. The method according to claim 1, further comprising the steps of:
    said robotic library communication protocol including a destination address field for each packet for storing an address of an intended recipient for each packet, a source address field for each packet for storing an address of a sender of each packet, a type field for each packet for storing an indication of a type of each packet, a data field for storing user data, and an error checking field for each packet for storing an error checking character for each packet.

6. The method according to claim 1, further comprising the steps of:
    receiving a message to be transmitted to a recipient robotic mechanism;
    encoding said message utilizing said protocol to produce a plurality of packets that conform to said protocol; and
    including only said preamble value in said preamble field of each one of said plurality of packets.

7. The method according to claim 6, further comprising the steps of:
    providing a power signal that is used to deliver power to said robotic mechanisms;
    converting said plurality of packets to an asynchronous data signal; and
    modulating said asynchronous data signal on top of said power signal.

8. The method according to claim 7, further comprising the steps of:
    delivering said power and said message to said recipient robotic mechanism utilizing said modulated signal.

9. The method according to claim 7, further comprising the steps of:
    converting said plurality of packets to a stream of bytes; and
    converting said stream of bytes to said asynchronous data signal using a start bit and two stop bits for each byte of said stream of bytes to delimit each byte of said stream of bytes from a next byte of said stream of bytes.

10. The method according to claim 1, further comprising the steps of:
    receiving a data signal by one of said robotic mechanisms;
    determining whether said data signal includes a preamble that stores said predetermined preamble value that is equal to said particular value;
    in response to determining that said data signal includes a preamble that stores said predetermined preamble value that is equal to said particular value, decoding a remainder of said data signal utilizing said protocol; and
    in response to determining that said data signal does not include a preamble that stores said predetermined preamble value that is equal to said particular value, discarding said data signal without processing a remainder of said data signal.

11. A system for transmitting data among robotic mechanisms and a controller computer system in an automated data storage library, said system comprising:
    a robotic library communication protocol for communicating among said robotic mechanisms and said controller computer system, said robotic library communication protocol defining a plurality of fields for each packet including a preamble field that describes a predetermined preamble value that is equal to a particular value;

data being transmitted among said robotic mechanisms and said controller computer system utilizing said robotic library communication protocol; and each packet that conforms to said protocol including only said preamble value in said preamble field.

12. The system according to claim 11, further comprising:

a power signal for providing power to said robotic mechanisms; and said power signal for transmitting said data.

13. The system according to claim 11, further comprising:

a power signal for providing power to said robotic mechanisms;

said data being transmitted using said power signal by modulating said data on top of said power signal to generate a modulated signal;

said modulated signal being transmitted to said robotic mechanisms; and said robotic mechanisms being powered by a power signal that is extracted from said modulated signal.

14. The system according to claim 13, further comprising:

said modulated signal being received at one of said robotic mechanisms;

said modulated signal being demodulated to produce a received data signal and received power; and said received power for powering said one of said robotic mechanisms.

15. The system according to claim 11, further comprising:

said robotic library communication protocol including a destination address field for each packet for storing an address of an intended recipient for each packet, a source address field for each packet for storing an address of a sender of each packet, a type field for each packet for storing an indication of a type of each packet, a data field for storing user data, and an error checking field for each packet for storing an error checking character for each packet.

16. The system according to claim 11, further comprising:

a message to be transmitted to a recipient robotic mechanism;

said message being encoded utilizing said protocol to produce a plurality of packets that conform to said protocol; and only said preamble value being included in said preamble field of each one of said plurality of packets.

17. The system according to claim 16, further comprising:

a power signal that is used to deliver power to said robotic mechanisms;

said controller computer system including a CPU executing code for converting said plurality of packets to an asynchronous data signal; and a MODEM for modulating said asynchronous data signal on top of said power signal.

18. The system according to claim 17, further comprising:

said power and said message being delivered to said recipient robotic mechanism utilizing said modulated signal.

19. The system according to claim 17, further comprising:

said plurality of packets being converted to a stream of bytes; and said stream of bytes being converted to said asynchronous data signal using a start bit and two stop bits for each byte of said stream of bytes to delimit each byte of said stream of bytes from a next byte of said stream of bytes.

20. The system according to claim 11, further comprising:

data signal being received by one of said robotic mechanisms;

said one of said robotic mechanisms including a computer system executing code for determining whether said data signal includes a preamble that stores said predetermined preamble value that is equal to said particular value;

in response to determining that said data signal includes a preamble that stores said predetermined preamble value that is equal to said particular value, said computer system executing code for decoding a remainder of said data signal utilizing said protocol; and in response to determining that said data signal does not include a preamble that stores said predetermined preamble value that is equal to said particular value, said computer system executing code for discarding said data signal without processing a remainder of said data signal.

* * * * *